Figure 1:
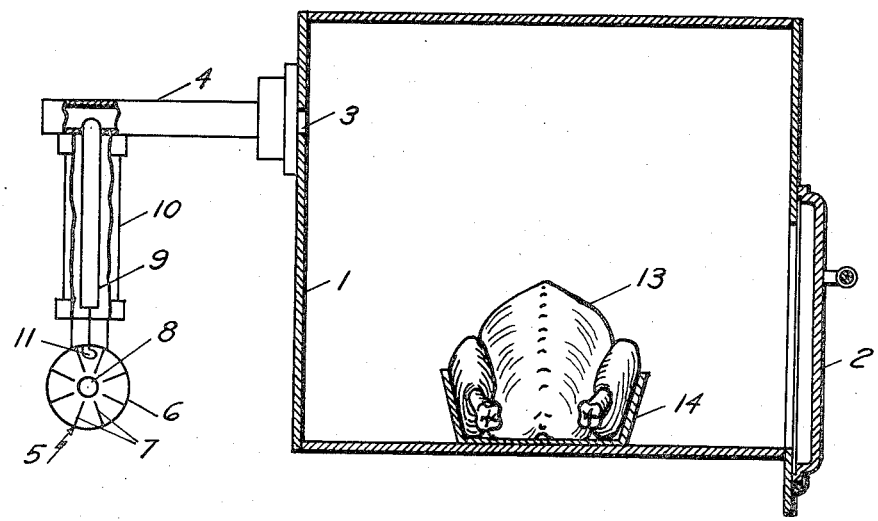

April 8, 1958  D. A. COPSON ET AL  2,830,162
HEATING METHOD AND APPARATUS
Filed June 22, 1954

INVENTORS
DAVID A. COPSON
LUTHER DAVIS, JR.
BY Elmer J. Gorn
ATTORNEY

United States Patent Office

2,830,162
Patented Apr. 8, 1958

2,830,162

HEATING METHOD AND APPARATUS

David A. Copson, Waltham, and Luther Davis, Jr., Belmont, Mass., assignors to Raytheon Manufacturing Company, Waltham, Mass., a corporation of Delaware Application June 22, 1954, Serial No. 438,554

13 Claims. (Cl. 219—10.41)

This invention relates to radiant energy, and particularly to the preparation of food by application of electromagnetic wave energy to a control element having contact with the food while the latter is in cooking position. The invention provides a controlled cooking method including the step of causing the food to be placed in a position of substantial surface contact with a control element having a variable energy absorption factor, to the end that the said contacted surface of the food will be caused to assume a browned, seared, or crusted condition and at the same time will be protected against the possibility of being scorched, burned or blackened; there being a significant decrease in the energy loss characteristics in the vicinity of the Curie point of said control element, which decrease serves to prevent overheating of the control element and thereby prevents such scorching, burning, or blackening.

The controlled cooking method of the invention, in another of its aspects, includes the step of fashioning the above-described control element into the form of a food contacting cooking utensil whose composition is such as to limit its major energy absorbing capacity to a particular temperature range, and the further step of applying radio frequency energy to said utensil for conversion by said utensil to heat for transfer to the food or other article disposed within or upon said utensil, the energy absorption being at a more or less rapid rate until a predetermined temperature is reached, and at a drastically reduced rate thereafter.

The invention also resides in the apparatus herein disclosed for practicing the controlled heating or cooking method above described, and in the physical and/or chemical composition of said heating or cooking utensil or control element. More particularly, the invention embraces the concept of providing a cooking or heating utensil or control element composed of materials whose reaction to the application of radiant energy is in accordance with the energy absorption law herein referred to as the Curie effect. As applied herein, this may be defined as the capacity of the control element to resist additional conversion of radio frequency energy into heat after such control element has been heated to a critical temperature constituting the Curie temperature for such material, any further R. F. energy theerafter received being transmitted as R. F. energy without significant loss.

Figure 2:
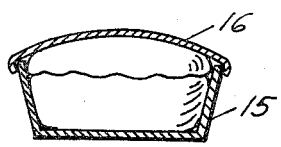
Figure 3:
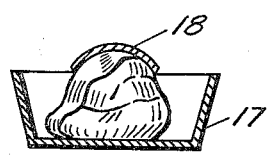

These and other aspects of the invention will be better understood as the description progresses, reference being had to the accompanying drawings wherein:

Fig. 1 is a view of an oven equipped with microwave heating means and with a control element to which the invention is applicable; and Figs. 2 and 3 illustrate typical arrangements of control elements in relation to foods whose cooking is to be controlled.

While the invention is applicable to any form of electronic cooking, Fig. 1 shows merely for illustration an electronic cooking apparatus of the type described and claimed in United States patent to Hall No. 2,618,735, granted November 18, 1952. A hollow rectangular enclosure 1 of suitable thin metal constitutes the cooking cavity. A hinged metallic door provides access to the cavity. When closed, the door 2 completely seals the cavity 1 except for an opening 3 aligned with the wave guide structure 4. Wave guide 4 receives energy from electron discharge device 5 which is illustrated as being of the magnetron type but may alternatively be of any other type capable of generating or transmitting R. F. energy to the wave guide 4. Magnetron 5 has an evacuated envelope 6 of highly conductive material as, for example, copper, and a plurality of inwardly directed radially disposed anode vanes 7. The arrangement is such that each pair of adjacent anode vanes forms, together with that portion of the envelope lying therebetween, a cavity resonator whose natural resonant frequency is a function of the geometry of the physical elements defining it.

Centrally located within the envelope 6 is a highly emissive cathode member 8 provided with conventional means (not shown) for raising the temperature to a level sufficient for thermionic emission.

Magnetron 5 has associated therewith the usual magnetic means (not shown) for establishing a magnetic field in a direction transversely of the electron path between the cathode and anode members. The magnetron when energized from a suitable source (not shown) delivers high frequency electromagnetic wave energy to a coaxial transmission line whose inner conductor 9 is coupled to oscillator 5 by a loop 11, the outer conductor 10 being connected to envelope 6. The high frequency (microwave) energy is delivered to the hollow wave guide 4 by way of the central conductor 9 whose terminal probe extends into said wave guide through a laterally disposed opening therein. From wave guide 4, the energy enters the interior of oven 1 and is directed to all regions of the food 13 and to all parts of the food retainer 14 constructed in accordance with the principles of the present invention. As heretofore noted, any equivalent R. F. energy generating and transmitting means may be substituted for magnetron 5.

For the browning, searing, frying or crusting of a food and for equivalent heating purposes, it is usually desirable to have the cooking or heating utensil warm up very quickly to a certain optimum temperature, and then remain at approximately that temperature for the balance of the cycle. All ferromagnetic and ferroelectric materials have a Curie temperature above which power absorption in general decreases radically. By proper choice of materials this temperature can be made to coincide with the optimum surface cooking temperature for a particular food or groups of foods, so that a cooking utensil or control element constructed of such materials can serve as the vehicle for practicing the controlled cooking method herein described. In Fig. 1, the cooking utensil 14 is shown as taking the form of a four-sided open dish whose composition includes one or more ferrite materials, such as zinc ferrite, magnesium ferrite, copper ferrite, or any of the other commonly used ferrites, particularly those having Curie points between forty degrees C. and 600 degrees C. These ferrite materials, strictly speaking, are ferrimagnetic rather than ferromagnetic, but, as they behave in many ways like ferromagnetic materials, they are commonly referred to as being in the latter category.

In Fig. 2, the food containing utensil 15 is of a shape corresponding to that of the utensil of Fig. 1 but is supplemented by a convexly curved rigid or semiflexible cover element 16, which cover element may also be constructed of a material having a variable energy absorbing factor so that its effect upon the food contained within the utensil will be to produce a browning, searing, or crusting of the upper surface of the food where contact is established with the undersurface of the cover. In such an arrangement as is illustrated in Fig. 2, the main portion of the dish may or may not be of the same material as the cover element 16, depending upon whether it is desired to achieve a searing, browning, or crusting effect along the entire surface of the food being prepared or whether such an effect is desired only for the upper surface thereof where contact is established with the cover element.

Fig. 3 shows another arrangement in which the control material 18 lies against only a certain fractional part of the entire surface of the article being cooked, in which case the searing, browning, or crusting effect will be limited to that portion of the surface of the article which is in contact with the control element so applied. Here again the confining dish 17 may or may not be of such material, depending upon the effect desired.

Many ferroelectric and ferromagnetic materials can be prepared in ceramic form. These can be readily constructed, as by pressure molding, to achieve the contour of a rack, plate, hot cover, loaf case or any other contour facilitating attainment of the desired effect. They can be employed in such a manner as to absorb the heat generated by the microwave energy applied thereto by known procedures and known wave guiding structures. Such devices, whether in the form of a completely enclosing utensil, as in Fig. 2, or in the form of merely a superimposed control pad or pads, as in Fig. 3, will absorb radio frequency power during the first stage of the heating cycle; but as soon as the predetermined temperature is reached there will be reduction or substantial termination of the process of conversion of the R. F. energy to heat, and thereafter the continued flow of R. F. energy through the control pad or utensil will exert a cooking effect only upon the interior of the food, that is, there will be no further increase in temperature at the outer surface of the food at those points where said outer surface has contact with said control path or utensil. Thus, the cooking temperature of said outer surface will be maintained near the Curie point and the danger of burning or scorching such outer surface will thereby be avoided.

Utensils constructed of materials such as those heretofore in common use, as, for example, silicon carbide and borosilicate glassware, are relatively high loss substances. They absorb microwave energy and convert it to heat at a rapid rate at all temperatures and hence are subject to overheating and frequently cause food burning, it being difficult to determine the exact moment for discontinuance of the cooking action under all conditions. With the substitution of the controlled heating method and the Curie temperature controlled materials herein proposed, such overheating of the food surface cannot occur even in cases where there is a prolonged delay in the discontinuance of R. F. energy transmission through said control material into the interior of the food following arrival of the outer surface of the food at the Curie temperature marking the point of significant decrease in energy losses.

In the appended claims the term "ferromagnetic-like" is used to describe any ferromagnetic, ferrimagnetic, or ferroelectric subsstance adapted to sustain an alternating electric or electro-magnetic field when supplied with R. F. energy, and having a high energy loss characteristic at temperatures below the Curie point for such material, and a low loss characteristic above the Curie point.

Examples of suitable ferrimagnetic materials have been noted above. Examples of suitable ferromagnetic materials are Heusler alloys of manganese, tin, and copper, or manganese, aluminum and copper; also, alloys of iron and sulphur, such as pyrrhotite, whose crystals have the form of hexagonal prisms. Examples of suitable ferroelectric materials are the zircomates of lead and barium and the titanates of lead, barium and strontium. The materials listed are merely examples of suitable substances, not necessarily the best for all applications of the invention. For certain heating and cooking operations, control elements composed of ferromagnetic-like materials other than those listed may be preferable.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. A controlled heating method including the steps of placing an object responsive to electromagnetic energy in juxtaposed relation to a control element absorptive of electromagnetic energy for conserving said energy into heat before reaching its Curie point and thereafter becoming substantially non-responsive and pervious to said energy, impinging electromagnetic energy on said object and said control element, and continuing the application of said energy beyond the Curie point of said control element, whereby said object is heated by conduction from said control element by the electromagnetic energy impinging directly thereon and by the energy passing through said control element after said control element reaches its Curie point.

2. A controlled heating method including the steps of enclosing an object responsive to electromagnetic energy in a control element responsive to electromagnetic energy impinging thereon for heating to its Curie point and thereafter becoming substantially non-responsive and pervious to said energy, impinging electromagnetic energy on said control element and continuing the application of said energy beyond the Curie point of said control element, whereby said object is heated by conduction from said control element and by said energy passing through said control element after said control element heats to its Curie point.

3. A controlled heating method including the steps of placing a high-energy loss body in juxtaposed relation to a control element absorptive of substantially the preponderance of electromagnetic energy impinging thereon for heating to its Curie point and thereafter becoming non-absorptive of said energy and substantially pervious thereto, impinging electromagnetic energy on said body and said control element and continuing the application of said energy beyond the Curie point of said control element, whereby said body is heated by conduction from said control element, by said energy impinging on said body directly and by said energy passing through said control element after said control element heats to its Curie point.

4. A controlled heating method including the steps of placing a high-energy loss body in juxtaposed relation to a cooking utensil absorptive of and substantially impervious to electromagnetic energy impinging thereon for heating to a predetermined temperature before becoming relatively non-absorptive and substantially pervious to said energy, impinging electromagnetic energy on said body and said utensil and continuing the application of said energy after said utensil heats to the predetermined temperature, whereby said body is heated by conduction from said utensil, by said energy impinging thereon and by said energy passing through said utensil after said utensil heats to said predetermined temperature.

5. A controlled heating method including the steps of placing an edible product in contact with a cooking utensil adsorptive of and substantially impervious to electromagnetic energy impinging thereon for heating to a predetermined temperature and thereafter becoming relatively non-absorptive of and substantially pervious to said energy, impinging electromagnetic energy in said utensil and said product and continuing the application of said energy beyond the heating of said utensil to the predetermined temperature, whereby the portion of said product in contact with said utensil is heated mainly by conduction before said utensil reaches the predetermined temperature and the interior of said product is heated primarily by electromagnetic energy thereafter.

6. A controlled heating method including the steps of placing a high-energy loss body to be heated in a cooking utensil and in contact with a temperature-sensitive control element of said utensil, impinging electromagnetic energy on said body, said control element being only slightly pervious to and substantially absorptive of said energy and being responsive to absorbed energy for converting a substantial quantity of the energy impinging thereon into heat until said control element heats to a predetermined temperature and thereafter, upon continuing the application of said energy, becoming substantially non-absorptive and more pervious to said energy, whereby the exterior of said body in contact with said control element is heated mainly by conduction before said control element heats to the predetermined temperature and the exterior and the interior of said body are heated by direct exposure to said energy and by the energy passing through said control element after said control element becomes heated to said predetermined temperature.

7. In combination, an oven receptive of electromagnetic energy, a control element constructed of a material having a Curie point and positioned in said oven, a body heated in response to said electromagnetic energy and positioned juxtaposed to said control element, said control element being absorptive of a major portion of said electromagnetic energy impinging thereon until said element is heated to its Curie point, said control element thereafter becoming substantially pervious to said energy.

8. In combination, an oven receptive of electromagnetic energy, a control element constructed of a ferromagnetic-like material and positioned in said oven, a body subjected to said electromagnetic energy and in contact with at least a portion of said control element, said control element being absorptive of a major portion of said electromagnetic energy impinging thereon until said control element becomes heated to a predetermined temperature, said control element being substantially pervious to said energy when the temperature of said control element exceeds said predetermined temperature.

9. In combination, an oven including a source of electromagnetic energy to impinge energy on a control element positioned in said oven, an edible product carried in said control element, said control element including a ferromagnetic material and being responsive to electromagnetic energy impinging thereon for converting a portion of the energy impinging thereon into heat until said control element becomes heated to a predetermined temperature and thereafter becoming substantially non-responsive and pervious to said energy, whereby said body is heated by conduction and by the energy impinging thereon directly and by the energy passing through thereon after said control element becomes heated to the predetermined temperature.

10. A cooking apparatus comprising an oven, a source of electromagnetic energy therein, a cooking utensil including a ferromagnetic element disposed in said oven to function as a temperature-sensitive cooking receptacle for a high-energy loss body to be cooked therein, said utensil being responsive to electromagnetic energy impinging thereon for converting a portion of said energy into heat until said utensil heats to a predetermined temperature and thereafter becoming substantially non-responsive and pervious to said energy, whereby the body placed in said utensil in juxtaposed relation thereto is cooked by heat conducted from said utensil to the body by energy impinging directly on the body and by energy passing through said utensil into the body after said utensil becomes heated to the predetermined temperature.

11. A cooking apparatus comprising an oven including a source of electromagnetic energy to impinge energy on a cooking utensil disposed in said oven for carrying a body responsive to electromagnetic energy in contact therewith, said utensil including ferromagnetic substances and being substantially impervious and responsive to electromagnetic energy for converting a portion of electromagnetic energy impinging thereon into heat until said utensil heats to a predetermined temperature and thereafter becoming substantially non-responsive and pervious to said energy, whereby the body placed in said utensil is cooked by heat conducted from said utensil to the body and by the energy passing through said utensil into the body after said utensil becomes heated to the predetermined temperature.

12. In combination, an oven comprising a substantially closed cavity, means for energizing said cavity with microwave energy, said cavity having positioned therein a container containing a body to be heated in response to impingement thereon of said microwave energy, said container being constructed of a ferromagnetic-like material, said container being substantially absorptive of microwave energy when heated over a first temperature range and transparent to microwave energy when heated over a second temperature range in excess of said first temperature range.

13. In combination, an oven comprising a substantially closed cavity, means for energizing said cavity with microwave energy, said cavity having positioned therein a control element disposed in contact with at least a portion of a body to be heated when subjected to the microwave energy, said control element being constructed of a material having ferromagnetic-like properties when heated to a temperature below a predetermined temperature, said control element transmitting an appreciable part of said energy therethrough to said portion of said body only when said element attains a temperature in excess of said predetermined temperature.

References Cited in the file of this patent

UNITED STATES PATENTS

| | | |
|---|---|---|
| 2,448,011 | Baker et al. | Aug. 31, 1948 |
| 2,452,529 | Snoek | Oct. 26, 1948 |
| 2,480,682 | Stiefel | Aug. 30, 1949 |
| 2,504,109 | Dakin et al. | Apr. 18, 1950 |
| 2,540,036 | Spencer | Jan. 30, 1951 |
| 2,565,058 | Albers-Schoenberg | Aug. 21, 1951 |
| 2,565,111 | Albers-Schoenberg | Aug. 21, 1951 |
| 2,584,324 | Bousky | Feb. 5, 1952 |
| 2,595,748 | Andrews | May 6, 1952 |
| 2,597,237 | Friend | May 20, 1952 |
| 2,612,596 | Gross | Sept. 30, 1952 |
| 2,628,104 | Shardlow | Feb. 10, 1953 |
| 2,645,758 | Van De Lindt | July 14, 1953 |
| 2,714,070 | Welch | July 26, 1955 |

FOREIGN PATENTS

| | | |
|---|---|---|
| 635,421 | Great Britain | Apr. 12, 1950 |

UNITED STATES PATENT OFFICE

CERTIFICATE OF CORRECTION

Patent No. 2,830,162                                        April 8, 1958

David A. Copson et al.

It is hereby certified that error appears in the printed specification of the above numbered patent requiring correction and that the said Letters Patent should read as corrected below.

Column 4, line 16, for "conserving" read -- converting --.

Signed and sealed this 19th day of May 1959.

(SEAL)
Attest:

KARL H. AXLINE                                               ROBERT C. WATSON
Attesting Officer                                         Commissioner of Patents